United States Patent
Petersen et al.

(10) Patent No.: US 9,454,391 B2
(45) Date of Patent: Sep. 27, 2016

(54) PROGRAMMING OF A DECT/CAT-IQ COMMUNICATION DEVICE

(75) Inventors: Jens Toftgaard Petersen, Svenstrup J (DK); Peter Mariager, Aalborg (DK)

(73) Assignee: RTX A/S, Norresundby (DK)

( * ) Notice: Subject to any disclaimer, the term of this patent is extended or adjusted under 35 U.S.C. 154(b) by 828 days.

(21) Appl. No.: 13/576,516

(22) PCT Filed: Feb. 3, 2011

(86) PCT No.: PCT/DK2011/050029
§ 371 (c)(1),
(2), (4) Date: Nov. 12, 2012

(87) PCT Pub. No.: WO2011/095171
PCT Pub. Date: Aug. 11, 2011

(65) Prior Publication Data
US 2013/0045730 A1    Feb. 21, 2013

(30) Foreign Application Priority Data
Feb. 3, 2010    (DK) .................................. 2010 70037

(51) Int. Cl.
*G06F 9/445* (2006.01)
*G06F 9/455* (2006.01)

(52) U.S. Cl.
CPC .................. *G06F 9/45516* (2013.01)

(58) Field of Classification Search
CPC .......................... G06F 9/45516; G06F 9/4552
USPC ............................. 455/574, 573, 575.1, 418
See application file for complete search history.

(56) References Cited

U.S. PATENT DOCUMENTS

| | | | | |
|---|---|---|---|---|
| 5,617,084 A | * | 4/1997 | Sears ....................... | 340/870.02 |
| 8,126,516 B2 | * | 2/2012 | Johnston et al. ............ | 455/573 |
| 2006/0174235 A1 | * | 8/2006 | Kamada et al. .............. | 717/141 |

(Continued)

FOREIGN PATENT DOCUMENTS

| | | |
|---|---|---|
| EP | 1 416 378 A2 | 5/2004 |
| EP | 1 598 739 A1 | 11/2005 |

OTHER PUBLICATIONS

International Search Report for PCT/DK2011/050029 dated May 11, 2011.

*Primary Examiner* — Christopher M Brandt
(74) *Attorney, Agent, or Firm* — Knobbe Martens Olson & BEar LLP

(57) ABSTRACT

A method for programming a processor in a communication device arranged for communication according to a DECT/CAT-iq protocol. The method has three steps: 1) A high level language program code is provided, the program code being arranged to influence a function of the communication device. E.g. this program code may be an application program code. 2) The program code is then interpreted into a corresponding machine language code arranged for execution on the processor in the communication device. 3) Finally, this machine language is executed by the processor in the communication device. This method allows a user to program the DECT/CAT-iq device in a high level language without the need for a compiler to compile the high level language program into a processor specific machine code. Preferably, the interpreting of the high level program code is performed by the processor (P) in the communication device. Especially, the processor (P) may be programmed to operate as a virtual central processing unit (VCPU).

17 Claims, 2 Drawing Sheets

(56) References Cited

U.S. PATENT DOCUMENTS

| | | |
|---|---|---|
| 2007/0254619 A1* | 11/2007 | Salomone et al. ......... 455/343.2 |
| 2008/0002692 A1* | 1/2008 | Meylan et al. ............... 370/390 |
| 2008/0209414 A1* | 8/2008 | Stein ............................. 717/173 |
| 2010/0136943 A1* | 6/2010 | Hirvela et al. ............. 455/404.1 |

\* cited by examiner

PROGRAMMING OF A DECT/CAT-IQ COMMUNICATION DEVICE

CROSS REFERENCE TO RELATED APPLICATIONS

This application claims the benefit and priority to and is a U.S. National Phase Application of PCT International Application Number PCT/DK2011/050029, filed on Feb. 3, 2011, designating the United States of America and published in the English language, which is an International Application of and claims the benefit of priority to Danish Patent Application No. PA 2010 70037, filed on Feb. 3, 2010. The disclosures of the above-referenced applications are hereby expressly incorporated by reference in their entireties.

FIELD OF THE INVENTION

The invention relates to the field of wireless Radio Frequency communication, more specifically Digital Enhanced Cordless Telecommunication (DECT) compatible communication. More specifically, the invention provides a method for programming a DECT/CAT-iq communication device.

BACKGROUND OF THE INVENTION

To improve the area of application of compact low cost communication devices, such as the mentioned battery-driven DECT compatible devices, it is necessary for the user or application engineer to be able to program the processor in such device. However, this normally requires downloading of an application specific program code written in a machine code specific for the type of processor in the communication device. Thus, normally this requires a high level programming language to machine code complier specific for the processor in question. This is expensive and limits the versatility of such devices. This means that in practice such low cost devices are locked with respect to their functionality.

SUMMARY OF THE INVENTION

Thus, according to the above, it is an object of the present invention to provide a method for programming a DECT compatible communication device which can be performed easily by an unskilled user, thus enabling an unskilled user or other devices to program the DECT device to perform a specific functionality.

In a first aspect, the invention provides a method for programming a processor in a communication device arranged for communication according to a Digital Enhanced Cordless Telecommunication/Cordless Advanced Technology—internet and quality (DECT/CAT-iq) protocol, the method comprising
  providing a program code in a first programming language, the program code being arranged to influence a function of said communication device, such as the program code being an application program code,
  interpreting said program code into a corresponding machine language code at a lower abstraction level than the first programming language, wherein the machine language code is arranged for execution on a processor in the communication device, and
  executing said machine language code by the processor.

Such method enables easy programming of a DECT device, such as a DECT/CAT-iq device, and thus enables easy development of application specific DECT/CAT-iq devices without the need for a machine code compiler for such programming. Thus, the user can generate an application specific program code in a high level programming language without knowing anything about the processor specific machine code language required by the processor in the communication device. This also means that the communication device becomes more versatile, since it is easy, either by the user or by an external device, to alter the functionality of the communication device. Thereby, even low cost communication devices can have a dynamic functionality which can change by downloading of high level application code. Thus, the communication device can be easily reconfigured to take different roles in different situations, e.g. when being part of a communication network. In other words, the same hardware can be reused for different functions. Further, the hardware platform, i.e. including the processor, can be changed without interfering with the application code, since the application code does not need to be processor specific.

Preferably, said interpreting of said program code is performed by the processor in the communication device, such as the processor being programmed to operate as a virtual central processing unit. Thus, communication device may be arranged to receive a program code in a high level programming language and interpret such code by means of the virtual processor. Thus, in such embodiment the interpreter into the machine language code is provided on-board the communication device. Thus, an application programmer does not need to write a machine code program and does not need an interpreter to be able to change the function of the communication program. Further, such interpreting being performed by a virtual processor provides a high security against the application programmer accidentally destroying or unintentionally changes the communication protocol part of the execution code for the processor in the communication device.

Thus, preferably, the method comprises downloading said program code into the communication device, such as downloading said program into a memory of the communication device. Such downloading may be performed by means of a wireless communication link, such as a Digital Enhanced Cordless Telecommunication link, a Bluetooth link, a WiMAX link, a Global System for Mobile communication link, a Universal Mobile Telecommunications System link, a Long Term Evolution link, a WiFi link, or a Zigbee link. The downloading may alternatively be performed via a wired connection.

In some embodiment, the processor executes the machine language code along with interpretation of the program code, such as the execution of a part of the machine language code being performed after interpretation of a part of the program code. In other words, the processor may execute the machine language code on the fly rather than reading the entire machine language code from memory.

The method allows to use a high level programming language for development of application programs, such as a first programming language being Java, Basic, Perl, Lua, Forth, or Scheme.

A second aspect of the invention provides a communication device comprising
  a communication circuit arranged to receive or transmit a communication signal being a wireless Radio Frequency signal with a carrier frequency within 1.88 to 1.93 GHz, wherein the communication signal is arranged in accordance with a Digital Enhanced Cordless Telecommunication/Cordless Advanced Technology—internet and quality (DECT/CAT-iq) protocol, and a processor arranged to receive data represented in the communication signal or generate data for representation in the communication signal, wherein the processor is programmed by a method according to the first aspect.

Especially, the communication device may comprise a battery, such as a Lithium battery, arranged to power the communication circuit and the processor, and the device may be arranged to enter a power-saving mode of operation of at least part of the communication circuit between periods where the communication circuit is activated so as to receive or transmit the communication signal.

Such device can be provided in low cost versions and can have a long battery life-time, since the power-saving mode of operation helps to save power. Especially, power can be saved if the device is a Portable Part (PP) and especially in if the application of such PP only requires communication of a small amount of data such as: transmitting a sensed value, transmitting data regarding detection of a button being pushed or not, receiving regulation values or control data, or receiving an instruction "turn on" or "turn off".

In some embodiments, the communication device is arranged to stay in the power-saving mode of operation where the communication circuit is de-activated, until an event occurs, such as an event initiated by an external device or a user. Thus, a maximum amount of power is saved since the communication device skips synchronization with other devices until an event occurs that requires activation of the communication circuit. This is advantageous e.g. within applications where communication with the communication device is only required at irregular intervals which can not be pre-determined, and where typically such intervals between communication have a length of several minutes or even hours.

In other embodiments, a length between said periods is determined by the device itself e.g. the device being a PP, by an external communication device e.g. a Fixed Part (FP), or by a negotiation between the device and an external communication device e.g. an FP. Preferably, the device is arranged to enter the power-saving mode of operation for a duration of at least 1 second, such as at least 2 seconds, such as at least 5 seconds, such as at least 10 seconds, such as at least 20 seconds, such as at least 30 second, such as at least 40 seconds, such as at least 60 seconds, such as at least 2 minutes, such as at least 5 minutes, such as at least 10 minutes.

The communication signal is preferably arranged in frames of a predetermined length, and wherein the device is arranged to cyclically activate the communication circuit only during one frame out of a plurality of frames, such as one frame out of $2^n$ frames where n is an integer number, such as one frame out of 256 frames.

The communication circuit may comprise a receiver circuit arranged to receive an input signal being a wireless Radio Frequency signal with a carrier frequency within 1.88 to 1.93 GHz, wherein the input signal is arranged in accordance with a DECT/CAT-iq protocol, and wherein the processor is arranged to generate a control signal (CS) according to a predetermined algorithm in response to data received in said input signal, such as a control signal arranged to control a function of an external device, in response to said data, such as a control signal arranged to control a function of a thermostat. Preferably, the device is arranged to receive the input signal according to a connectionless oriented DECT protocol, such as according to a DECT/CAT-iq protocol. The control signal may be arranged to switch on or off the external device, or the control signal may be setting one or more parameter values in the external device. The control signal may be output from the device as one or more of: a wireless Radio Frequency signal, an electric signal provided on a terminal arranged on an exterior surface of the device. Especially, the control signal may be represented as data in said output.

The communication circuit, the processor, and the battery may be housed inside one common casing, thus constituting a simple device which can be manufactured in low cost versions. Still, the method according to the first aspect enables such simple and low cost devices to be highly versatile devices.

The device may be arranged to change between a connection oriented and a connectionless oriented Digital Enhanced Cordless Telecommunication protocol in accordance with the data received in the input signal.

The communication circuit may comprise a transmitter circuit arranged to transmit an output signal being a wireless Radio Frequency signal with a carrier frequency within 1.88 to 1.93 GHz, wherein the output signal is arranged in accordance with a DECT/CAT-iq protocol. The processor may be arranged to generate data and to represent the data in said output signal. The device may comprise one or more sensors. Such sensor(s) may be at least one of: a temperature sensor, a humidity sensor, a smoke sensor, a light sensor, a motion sensor, a pressure sensor, an infra red sensor, an intrusion sensor, a proximity sensor, an acoustic sensor such as a microphone, a mechanical sensor, a chemical sensor, a biological sensor, an electricity meter, a heat meter, a water meter, a gas meter, a fuel meter, and wherein the processor is arranged to generate said data in accordance with an output from said sensor.

The device may comprise a user interface arranged to receive an input from a user, wherein the user interface comprises at least one of: a switch, a potentiometer, a proximity sensor, keyboard, a touch screen, and a microphone, and wherein the processor is arranged to generate said data according to an output from said user interface.

The communication device may be embedded in a unit. Alternatively, the communication device is a stand-alone device.

The communication devices of the second aspect may form part of a network with a master device programmed to communicate data represented in the communication signal with a selected one of a plurality of communication devices according to the second aspect. The master device may have a connection to the Internet, such as a wireless connection to the Internet, such as a wire connection to the Internet. The master device may be a personal computer, a mobile phone, handheld computer device, or an Internet gateway device.

It is appreciated that embodiments mentioned for the first aspect may in any way be combined with embodiments of the second aspect.

BRIEF DESCRIPTION OF DRAWINGS

In the following, the invention will be described in more details by referring to embodiments illustrated in the accompanying drawings, of which

DETAILED DESCRIPTION OF THE INVENTION

Figure 1:
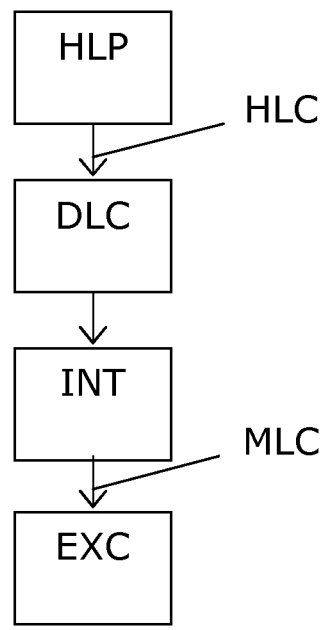
FIG. 1 shows an embodiment of the programming method according to the invention.

FIG. 1 illustrates the steps of an embodiment of the method according to the first aspect of the invention. First step is a high level programming HLP, where a high level program code HLC is generated, e.g. by a user in a user friendly high level programming language environment that allows the user to develop an application specific program code HLC which will allow the desired functionality of a DECT/CAT-iq communication device. Next, this high level program code HLC is downloaded into the communication device DLC, e.g. into a memory of the communication device via a wired or wireless interface. Further, this high level program code is interpreted INT into a machine readable program code MLC which can be executed by the processor of the communication device. Preferably, the processor itself, or another processor of the communication device, is programmed to interpret the high level program code HLC into the machine code MLC, and thus allow the last step, namely execution EXC of the machine code by the processor of the communication device. The machine code MLC may be stored in memory before it is executed by the processor, or the processor may execute the machine code MLC on the fly, e.g. along with interpretation of parts of the high level code HLC.

The interpretation of the high level code HLC in the DECT/CAT-iq communication device allows the user to develop program code in a high level language and thus allow non-experts to develop rather complex algorithms for the communication device which can be downloaded directly into the device. Thus, the user does not need a complier to the specific machine code language used by the processor in the device. The device can simply be programmed with an interpreter that can accept one or more different high level language codes HLC and interpret this code HLC into the processor specific code MLC required. Hereby, the device is highly versatile and open for a large number of applications, and still it rather simple and can be produced in low cost versions. Especially, both the device can be configured such that the interpretation from high level code HLC to machine code MLC can be performed by one single processor.

Figure 2:
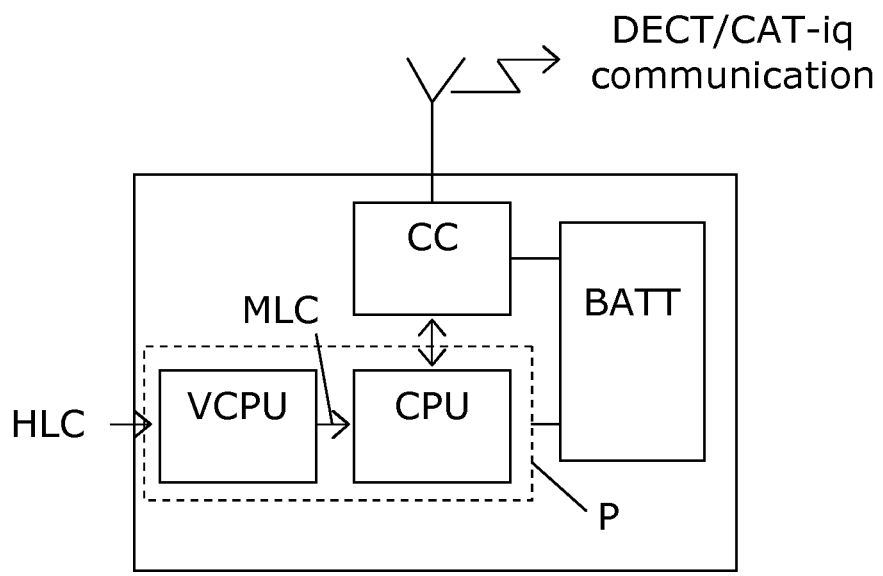
FIG. 2 illustrates a communication device embodiment in the form of a DECT/CAT-iq device with a virtual processor arranged for being programmed in a high level programming language.

FIG. 2 illustrates a communication device implemented to utilize the programming method of the first aspect of the invention. The device has a battery BATT for powering a communication circuit CC which communicates according to a DECT/CAT-iq protocol, and a processor P. The device is arranged to receive a program code in the form of a high level programming language code HLC. Preferably, the device has a memory for storing such code HLC. The processor P is implemented such that it operates as a normal CPU, and besides the processor P operates as a virtual processor VCPU. E.g. the processor P is programmed such that it acts as a virtual processor VCPU seen from outside. The virtual processor VCPU receives the high level program code HLC and interprets or translates this code HLC into a machine code MLC which is then executed by the CPU. In this way application programming is facilitated, since the machine specific translation or interpretation process is included in the communication device itself, and thus the application programmer can use a high level application programming language, e.g. Java.

Figure 3:
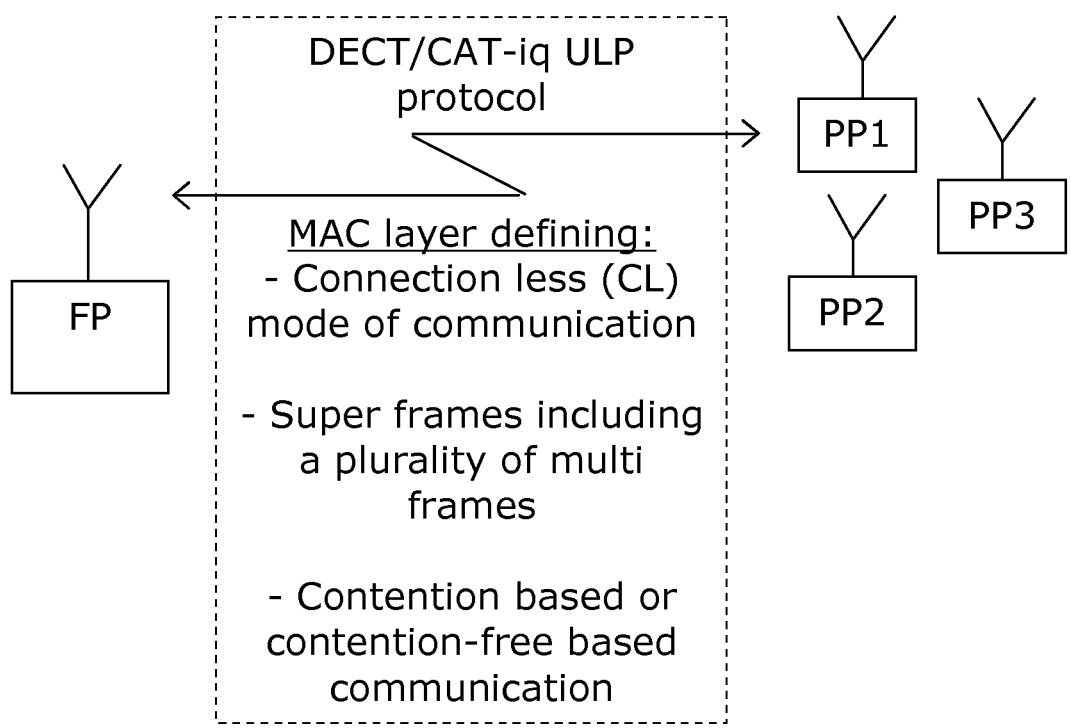
FIG. 3 illustrates basic elements of a network of PP communication devices and a FP device communicating according to a DECT/CAT-iq Ultra Low Power (ULP) protocol.

FIG. 3 illustrates an example of DECT/CAT-iq communication between communication device embodiments according to the invention in the form of a plurality of portable parts PP1, PP2, PP3 which communicate with a fixed part FP, e.g. an Internet gateway. The communication may be one-way (PP to FP only or FP to PP only) or two-way.

In a preferred embodiment, an Ultra Low Power (ULP) DECT/CAT-iq compatible protocol is provided by a protocol defining a connection less CL oriented mode of communication between the first and second communication devices FP and PP1, PP2, PP3. Such protocol allows selection between contention based communication and/or contention-free based communication with a fixed allocated bandwidth. Such selection may be performed by the FP or on request by the PP. Further, such protocol may comprise a definition of a super frame comprising a plurality of multi frames, i.e. a long frame wherein each multi frame comprises a plurality of single frames. E.g. one multi frame including 16 frames, and wherein the super frame includes 256 multi frames, thereby providing a super frame with a duration of 40.96 seconds, using a normal frame length.

Preferably, the PPs are arranged such that their communication circuits can enter a power saving mode, e.g. by de-activating their communication circuits partly or fully. In combination with a preferred protocol, the PP is allowed to "fall asleep", i.e. enter a power saving mode of operation and only transmit and/or receive in one or a few frames out of each super frame, and thus the PP only needs to be fully active in the transmitting/receiving periods required by its application. In a simple implementation, the PP is in default in power saving mode most of the time, unless when according to an internal timer, it is scheduled time, i.e. it is scheduled frame number(s) within the super frame, for the PP to transmit and/or receive.

Thus, such ULP DECT/CAT-iq protocol is suited for communication networks of an FP communicating with a plurality of PPs, and wherein the PPs are battery-powered devices arranged for utilizing the power saving possibilities provided by the connection less oriented communication using super frames.

To sum up, the invention provides a method for programming a processor in a communication device arranged for communication according to a DECT/CAT-iq protocol. The method has three steps: 1) A high level language program code is provided, the program code being arranged to influence a function of the communication device. E.g. this program code may be an application program code. 2) The program code is then interpreted into a corresponding machine language code arranged for execution on the processor in the communication device. 3) Finally, this machine language is executed by the processor in the communication device. This method allows a user to program the DECT/CAT-iq device in a high level language without the need for a compiler to compile the high level language program into a processor specific machine code. Preferably, the interpreting of the high level program code is performed by the processor (P) in the communication device. Especially, the processor (P) may be programmed to operate as a virtual central processing unit (VCPU).

Although the present invention has been described in connection with the specified embodiments, it is not intended to be limited to the specific form set forth herein. Rather, the scope of the present invention is limited only by the accompanying claims. In the claims, the term "comprising" or "including" does not exclude the presence of other elements. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method for programming a processor in a communication device arranged for communication according to a Digital Enhanced Cordless Telecommunication/Cordless Advanced Technology—internet and quality (DECT/CAT-iq) protocol, the method comprising:
   providing a program code in a first programming language, the program code being arranged to influence a function of said communication device, wherein the program code is an application program code;
   downloading said program code into the communication device by a wired link or by a wireless link;
   interpreting said program code by the processor in the communication device, into a corresponding machine language code at a lower abstraction level than the first programming language, wherein the machine language code is arranged for execution on a processor in the communication device; and
   executing said machine language code by the processor.

2. The method according to claim 1, wherein the processor is programmed to operate as a virtual central processing unit (VCPU).

3. The method according to claim 1, wherein the processor executes the machine language code along with interpretation of the program code.

4. The method according to claim 1, wherein the first programming language is Java, Basic, Perl, Lua, Forth, or Scheme.

5. The method according to claim 1, wherein the first programming language is a high level programming language.

6. A communication device comprising:
   a communication circuit arranged to receive or transmit a communication signal that is a wireless Radio Frequency signal with a carrier frequency within 1.88 to 1.93 GHz, wherein the communication signal is arranged in accordance with a Digital Enhanced Cordless Telecommunication/Cordless Advanced Technology—internet and quality (DECT/CAT-iq) protocol, and
   a processor arranged to receive data represented in the communication signal or generate data for representation in the communication signal, wherein the processor is programmed by a method according to claim 1.

7. The communication device according to claim 6, further comprising a battery arranged to power the communication circuit and the processor, wherein the communication circuit (CC), the processor (CPU), and the battery (BATT) are housed inside one common casing.

8. The communication device according to claim 6, arranged to enter a power-saving mode of operation of at least part of the communication circuit between periods where the communication circuit is activated so as to receive or transmit the communication signal.

9. The communication device according to claim 6, wherein a length between one or more periods of communication is determined by the device itself, an external communication device, or a negotiation between the device and an external communication device.

10. The communication device according to claim 6, wherein the device is arranged to enter the power-saving mode of operation for a duration of at least 1 second.

11. The communication device according to claim 6, wherein the communication signal is arranged in frames of a predetermined length, and wherein the device is arranged to cyclically activate the communication circuit only during one frame out of a plurality of frames.

12. The communication device according to claim 6, wherein the device is arranged to change between a connection oriented and a connectionless oriented Digital Enhanced Cordless Telecommunication protocol in accordance with the data received in the communication signal.

13. The communication device according to claim 6, wherein the communication circuit comprises:
   a receiver circuit arranged to receive an input signal that is a wireless Radio Frequency signal with a carrier frequency within 1.88 to 1.93 GHz, wherein the input signal is arranged in accordance with a Digital Enhanced Cordless Telecommunication/Cordless Advanced Technology—internet and quality (DECT/CAT-iq) protocol, and wherein the processor is arranged to generate a control signal (CS) according to a predetermined algorithm in response to data received in said input signal, in response to said data.

14. The communication device according to claim 6, wherein the communication circuit comprises:
   a transmitter circuit arranged to transmit an output signal that is a wireless Radio Frequency signal with a carrier frequency within 1.88 to 1.93 GHz, wherein the output signal is arranged in accordance with a Digital Enhanced Cordless Telecommunication/Cordless Advanced Technology—internet and quality (DECT/CAT-iq) protocol.

15. The communication device according to claim 14, wherein the processor (CPU) is arranged to generate data and to represent the data in said output signal.

16. The communication device according to claim 14, further comprising one or more sensors selected from the group consisting of: a temperature sensor, a humidity sensor, a smoke sensor, a light sensor, a motion sensor, a pressure sensor, an infra red sensor, an intrusion sensor, a proximity sensor, an acoustic sensor such as a microphone, a mechanical sensor, a chemical sensor, a biological sensor, an electricity meter, a heat meter, a water meter, a gas meter, and a fuel meter, and wherein the processor is arranged to generate said data in accordance with an output from said sensor.

17. The communication device according to claim 6, further comprising a user interface (UI) arranged to receive an input (U_INP) from a user, wherein the user interface (UI) comprises at least one of: a switch, a potentiometer, a proximity sensor, a keyboard, a touch screen, or a microphone, and wherein the processor (P) is arranged to generate said data according to an output from said user interface (UI).

* * * * *